United States Patent Office 3,439,005
Patented Apr. 15, 1969

3,439,005
DIHALO SUBSTITUTED PHOSPHORANYLIDENE-
AMINO BENZOQUINONES AND METHOD FOR
THEIR PRODUCTION
William Lindsay Mosby, North Plainfield, Helen Currier
Gillham, Princeton, and Allan Ellis Sherr, Martinsville,
N.J., assignors to American Cyanamid Company,
Stamford, Conn., a corporation of Maine
No Drawing. Original application Feb. 17, 1964, Ser. No.
345,075, now Patent No. 3,322,860, dated May 30,
1967. Divided and this application Dec. 19, 1966, Ser.
No. 602,465
Int. Cl. C07f 9/54; C09k 3/28
U.S. Cl. 260—396                                     8 Claims

ABSTRACT OF THE DISCLOSURE

A process for the production of dihalo substituted phosphoranylideneamino benzoquinones and the compounds per se are disclosed.

This application is a division of our copending application, Serial No. 345,075, filed February 17, 1964 and now U.S. Patent No. 3,322,860.

The search for compounds, mixtures of compounds or compositions of matter as flame retardants for thermoplastic polymers has been intensively conducted industrially. The use of materials containing phosphorus and/or nitrogen atoms as flame-retardant additives for some polymers has been recognized, as has been the use of various halogenated materials such as the halogenated styrene copolymers and various additive mixtures such as chlorinated paraffin wax with triphenyl stibine, chlorinated paraffins with aliphatic antimony compounds, and antimony-oxide-chlorinated hydrocarbon mixtures. A drawback, however, in regard to the known prior art materials which have been used as flame retardants, has been the fact that generally a large amount, i.e. upwards of 35%, of the additive must be incorporated into the polymer in order to make it sufficiently flame retardant. Additionally, the known flame retardant additives have a tendency to crystallize or oil out of the resin a relatively short time after incorporation.

We have found a new group of compounds which may be added to thermoplastic resins, in relatively small amounts, to produce excellent flame-retardant compositions. A further feature resides in the fact that these new additives do not crystallize or oil out after incorporation into the resin.

The production of thermoplastic resin compositions which are flame-retardant, i.e. have high resistance to burning, is of considerable importance commercially. For example, such articles as castings, moldings, foamed or laminated structures and the like are required, or at least desired, to be resistant to fire and flame and to possess the ability to endure heat without deterioration. Typical illustrations of applications of materials of this type include moldings for live electrical contacts which should not be ignited or deteriorated by heat and sparks. Additionally, structural members such as pipes, wall coverings, wall paneling, glazing, etc. and articles such as ash trays, waste baskets, fibers and the like are further examples of products wherein flame retardance is desirable.

It is therefore an object of the present invention to provide a novel class of compounds and a method for the production thereof.

It is a further object of the present invention to provide a method for the production of a novel class of dihalo substituted phosphoranylideneamino benzoquinones and the compounds per se.

It is a further object of the present invention to provide flame-retardant compositions comprising thermoplastic polymers containing a flame-retarding amount of a dihalo substituted phosphoranylideneamino benzoquinone.

These and other objects will become more apparent to those skilled in the art upon reading the more detailed description set forth hereinbelow.

The novel method and compounds

The novel dihalo substituted phosphoranylideneamino benzoquinones of the instant invention are represented by the formula (I)
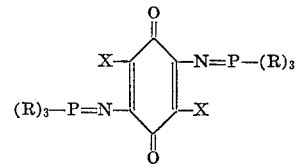

wherein X is a chlorine, bromine or iodine radical and R is a phenyl, naphthyl, substituted phenyl or substituted naphthyl radical said substituents being halogen, lower alkyl or lower alkoxy radicals.

These compounds are solid in nature and have relatively high melting points, e.g., as high as 360° C. They are soluble in such organic solvents as chloroform, pyridine, quinoline, dimethylformamide, dimethylsulfoxide, dimethyacetamide and the like.

The compounds of Formula I may be produced, according to our novel procedure, by reacting a 2,5-dihalo-3,6-diaminobenzoquinone with a trisubstituted, i.e. (R)₃ phosphinium dihalide. The reaction proceeds according to the equation:

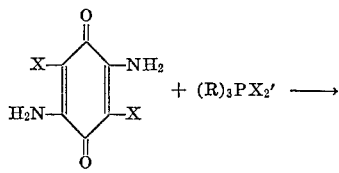

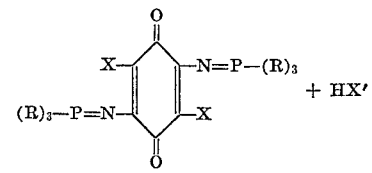

wherein R and X are as set forth hereinabove in regard to Formula I, and X′ is a halogen radical.

The reaction is preferably carried out at room temperature and atmospheric pressure, although higher or lower temperatures and pressures may be used if circumstances so dictate, and in the presence of an organic base, such as triethyl amine as a hydrogen halide acceptor and a solvent, such as toluene or chlorobenzene. Other acceptors which may be used include trimethylamine, pyridine and the like while ethylene glycol dimethyl ether, benzene and the like are examples of other solvents. The amounts of each of these compounds used are not critical, however enough of each should be employed to carry out their function as acceptor and solvent, respectively.

The reaction is generally allowed to continue for from about ½ to 4 hours although this range is not critical and shorter or longer times of contact may be used if necessary.

The molar ratio of the phosphinium halide to the dihalobenzoquinone used is about 2:1, however, it is preferable to utilize a slight excess of the phosphinium halide over said ratio to insure complete reaction of the available —$NH_2$ groups of the benzoquinone.

The products may be recovered by filtration, centrifugation etc. and may then be further purified by recrystallization and the like.

The phosphinium dihalide reactant may conveniently be prepared by reacting a trisubstituted, i.e. $(R)_3$ phosphine with a halogen, e.g. bromine, in a solvent such as chlorobenzene, under known conditions, while the benzoquinones are also well known and can be prepared as set forth, for example, in an article by von Knapp et al., Annalen der Chemie, volume 210, page 184, 1881.

Compounds which are represented by Formula I and which can be used to produce our novel flame-retardant compositions include:

2,5-dichloro-3,6-bis(triphenylphosphoranylideneamino)-p-benzoquinone,
2,5-dibromo-3,6-bis(triphenylphosphoranylideneamino)-p-benzoquinone,
2,5-diiodo-3,6-bis(triphenylphosphoranylideneamino)-p-benzoquinone,
2,5-dichloro-3,6-bis[tris(1-naphthyl)phosphoranylidene amino]-p-benzoquinone,
2,5-dibromo-3,6-bis[tris(1-naphthyl)phosphoranylideneamino]-p-benzoquinone,
2,5-diiodo-3,6-bis[tris(1-naphthyl)phosphoranylideneamino]-p-benzoquinone,
2,5-dichloro-3,6-bis[tris(p-chlorophenyl)phosphoranylideneamino]-p-benzoquinone,
2,5-dibromo-3,6-bis[tris(p-chlorophenyl)phosphoranylideneamino]-1-benzoquinone,
2,5-diiodo-3,6-bis[tris(p-chlorophenyl)phosphoranylideneamino]-p-benzoquinone,
2,5-dichloro-3,6-bis[tris(o-bromophenyl)phosphoranylideneamino]-p-benzoquinone,
2,5-dibromo-3,6-bis[tris(2,4-dichlorophenyl)phosphoranylideneamino]-p-benzoquinone,
2,5-diiodo-3,6-bis[tris(2,4-dichlorophenyl)phosphoranylideneamino]-p-benzoquinone,
2,5-dichloro-3,6-bis[tris(m-iodophenyl)phosphoranylideneamino]-p-benzoquinone,
2,5-dibromo-3,6-bis[tris(p-fluorophenyl)phosphoranylideneamino]-p-benzoquinone,
2,5-diiodo-3,6-bis[tris(p-fluorophenyl)phosphoranylideneamino]-p-benzoquinone,
2,5-dichloro-3,6-bis[tris(p-methylphenyl)phosphoranylideneamino]-p-benzoquinone,
2,5-dibromo-3,6-bis[tris(2,4-dimethylphenyl)phosphoranylideneamino]-p-benzoquinone,
2,5-diiodo-3,6-bis[tris(2,4-dimethylphenyl)phosphoranylideneamino]-p-benzoquinone,
2,5-dichloro-3,6-bis[tris(m-t-butylphenyl)phosphoranyl ideneamino]-p-benzoquinone,
2,5-dibromo-3,6-bis[tris(m-t-butylphenyl)phosphoranyl ideneamino]-p-benzoquinone,
2,5-diiodo-3,6-bis[tris(m-t-butylphenyl)phosphoranylideneamino]-p-benzoquinone,
2,5-dichloro-3,6-bis[tris(o-n-butylphenyl)phosphoranylideneamino]-p-benzoquinone,
2,5-dichloro-3,6-bis[tris(p-methoxyphenyl)phosphoranylideneamino]-p-benzoquinone,
2,5-dibromo-3,6-bis[tris(m-butoxyphenyl)phosphoranylideneamino]-p-benzoquinone,
2,5-dibromo-3,6-bis[tris(1-methyl-2-naphthyl)phosphoranylideneamino]-p-benzoquinone,
2,5-dichloro-3,6-bis[tris(3-n-butyl-1-naphthyl)phosphoranylideneamino]-p-benzoquinone,
2,5-dichloro-3,6-bis[tris(4-chloro-1-naphthyl)phosphoranylidene-amino]-p-benzoquinone,
2,5-dibromo-3,6-bis[tris(5-bromo-2-naphthyl)phosphoranylideneamino]-p-benzoquinone,
2,5-dibromo-3,6-bis[tris(2-iodo-1-naphthyl)phosphoranylideneamino]-p-benzoquinone,
2,5-dichloro-3,6-bis[tris(3-methoxy-2-naphthyl)phosphoranylideneamino]-p-benzoquinone,
2,5-diiodo-3,6-bis[tris(1-n-butoxy-2-naphthyl)phosphoranylidene-amino]-p-benzoquinone, and the like.

The novel flame-retardant compositions

The thermoplastic polymers into which the novel polymers of our invention may be incorporated to produce the novel flame retardant compositions of the present invention, are generally the vinyl type polymers wherein the monomeric material is polymerized, by any known method, via the vinyl unsaturation therein. Examples of the vinyl type polymers which may be used to form our novel compositions are the acrylates and methacrylates, the vinyl halides, the vinylidene halides, the vinyl acetates, polyvinyl butyral, butadiene copolymers, acrylonitrile-butadiene-styrene polymers, the acrylonitriles, etc. Additionally, and preferably, one may incorporate the flame retardant agents mentioned above into such polymers as the α-olefin polymers, such as the homopolymers and copolymers, etc. containing, as the major constituent, ethylene, propylene, and the like and the acrylates and methacrylate polymers produced from monomers having the formula (II) 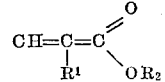

where $R^1$ is a hydrogen or methyl radical and $R^2$ is a hydrogen or an alkyl radical having from 1 to 6 carbon atoms, inclusive. Examples of monomers represented by Formula II include acrylic acid, methacrylic acid and their esters such as methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and the corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly, the allyl, methallyl, vinyl, methvinyl, butenyl, etc., unsaturated esters of aliphatic and aromatic monobasic acids, such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, propyl, ethyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl alchohol, methallyl alcohol, diallyl carbonate, allyl lactate, allyl methacrylate, allyl alphahydroxyisobutyrate, allyl trichlorosilane, diallyl phthalate, dially methtylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl isocyanurate, triallyl citrate, triallyl phosphate, tetrallyl silane, tetrallyl silicate, hexallyl disiloxane, allyl digylcol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

The novel flame-retardant compounds may be incorporated into the thermoplastic resins in flame-retarding amounts, i.e. generally amounts ranging from about 10%, by weight, to about 35%, by weight, preferably 15% to 25%, by weight, based on the weight of the resin have been found sufficient.

These benzoquinones may be incorporated into the resin by any known method. That is to say, the flame-retardant additive may be combined with the resin by milling the resin and the flame retardant benzoquinone on, for example, a two-roll mill, in a Banbury mixer, etc., or the benzoquinone may be added by molding it and resin simultaneously, extruding it and the resin or by merely blending the resin in powder form with the benzoquinone and thereafter forming the final desired article. Additionally, the novel flame-retardant compounds may also be added during the resin manufacture, i.e. during the monomer polymerization procedure, provided the catalyst etc., and other ingredients of the polymerization system are inert thereto.

It is within the scope of the present invention to incorporate such ingredients as plasticizers, dyes, pigments, fillers, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

Example 1

5.77 parts of triphenyl phosphine are dissolved in 50 parts of dry chlorobenzene and to the resultant mixture is added a solution of 3.52 parts of bromine in 10 parts of dry chlorobenzene. The addition is carried out with stirring, accompanied by cooling in an ice bath to produce the resultant triphenylphosphinium dibromide.

To this mixture, after warming to room temperature, are then added 2.07 parts of 2,5-dichloro-3,6-diaminobenzoquinone, 6 parts of triethyl amine and 25 parts of chlorobenzene. The mixture is refluxed with stirring until the reaction is complete (approximately one hour) and the solid material is then removed by filtration and washed with chlorobenzene. The solid material is washed further with water to remove water-soluble salts and finally with methanol. After drying, the product, 2,5-dichloro - 3,6-bis(triphenylphosphoranylideneamino) - p-benzoquinone, is obtained in solid form (6.8 parts) with a melting point greater than 360° C.

Following the procedure of Example 1, various phosphinium dihalides were reacted with diaminobenzoquinones to produce the corresponding phosphoranylideneamino benzoquinones according to the present invention. The results are set forth hereinbelow in Table I.

TABLE I

| Ex. | Phosphinium Dihalide | Diaminobenzoquinone | Temp., °C. | Product |
|---|---|---|---|---|
| 2 | Tris(1-naphthyl)phosphinium dibromide. | 2,5-dichloro-3,6-diaminobenzoquinone. | 23 | 2,5-dichloro-3,6-bis[tris(1-naphthyl)phosphoranylideneamino]-p-benzoquinone. |
| 3 | Tris(p-chlorophenyl)phosphinium dichloride. | 2,5-dibromo-3,6-diaminobenzoquinone. | 23 | 2,5-dibromo-3,6-bis[tris(p-chlorophenyl)phosphoranylideneamino]-p-benzoquinone. |
| 4 | Tris(o-bromophenyl)phosphinium dibromide. | 2,5-diiodo-3,6-diaminobenzoquinone. | 50 | 2,5-diiodo-3,6-bis[tris(o-bromophenyl)phosphoranylideneamino]-p-benzoquinone. |
| 5 | Tris(2,4-difluorophenyl)-phosphinium dibromide. | 2,5-dichloro-3,6-diaminobenzoquinone. | 50 | 2,5-dichloro-3,6-bis[tris(2,4-difluorophenyl) phosphoranylideneamino]-p-benzoquinone. |
| 6 | Tris(p-methylphenyl)phosphinium dibromide. | do | (¹) | 2,5-dichloro-3,6-bis[tris(p-methylphenyl)phosphoranylideneamino]-p-benzoquinone. |
| 7 | Tris(p-n-butylphenyl)phosphinium diiodide. | 2,5-dibromo-3,6-diaminobenzoquinone. | (¹) | 2,5-dibromo-3,6-bis[tris(p-n-butylphenyl)phosphoranylideneamino]-p-benzoquinone. |
| 8 | Tris(m-methoxyphenyl)phosphinium dibromide. | 2,5-dichloro-3,6-diaminobenzoquinone. | 75 | 2,5-dichloro-3,7-bis[tris(m-methoxyphenyl)phosphoranylideneamino]-p-benzoquinone. |
| 9 | Tris(p-butoxyphenyl)phosphinium dibromide. | 2,5-diiodo-3,6-diaminobenzoquinone. | 75 | 2,5-diiodo-3,6-bis[tris(p-butoxyphenyl)phosphoranylideneamino]-p-benzoquinone. |
| 10 | Tris(2-methyl-1-naphthyl) phosphinium dibromide. | 2,5-dichloro-3,6-diaminobenzoquinone. | 23 | 2,5-dichloro-3,6-bis[tris(2-methyl-1-naphthyl) phosphoranylideneamino]-p-benzoquinone. |
| 11 | Tris(3-butyl-2-naphthyl)phosphinium dibromide. | 2,5-dibromo-3,6-diaminobenzoquinone. | 23 | 2,5-dibromo-3,6-bis[tris(3-butyl-2-naphthyl)phosphoranylideneamino]-p-benzoquinone. |
| 12 | Tris(1-methoxy-2-naphthyl) phosphinium dibromide. | 2,5-dichloro-3,6-diaminobenzoquinone. | 23 | 2,5-dichloro-3,6-bis[tris(1-methoxy-2-naphthyl) phosphoranylideneamino]-p-benzoquinone. |
| 13 | Tris(5-butoxy-1-naphthyl) phosphinium dibromide. | do | (¹) | 2,5-dichloro-3,6-bis[tris(5-butoxy-1-naphthyl)phosphoranylideneamino]-p-benzoquinone. |
| 14 | Tris(3-chloro-2-naphthyl) phosphinium dibromide. | 2,5-dibromo-3,6-diaminobenzoquinone. | (¹) | 2,5-dibromo-3,6-bis[tris(3-chloro-2-naphthyl)phosphoranylideneamino]-p-benzoquinone. |
| 15 | Tris(6-bromo-1-naphthyl)phosphinium dibromide. | 2,5-dichloro-3,6-diaminobenzoquinone. | (¹) | 2,5-dichloro-3,6-bis[tris(6-bromo-1-naphthyl)phosphoranylideneamino]-p-benzoquinone. |
| 16 | Tris(4-iodo-2-naphthyl)phosphinium dibromide. | do | (¹) | 2,5-dichloro-3,6-bis[tris(4-iodo-2-naphthyl)phosphoranylideaneamino]-p-benzoquinone. |

¹ Reflux.

Any appropriate flame retardance test may be used to determine the flame retardant properties of any specific composition of the present invention. One test which is reasonably efficient is that designated as a modified version of ASTM test D-635-56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If after the two burnings, the strip is not burned to the 4" mark, the specimen is designated as "self-extinguishing" or "flame-retardant."

Example 17

Eighty (80) parts of polyethylene and 20 parts of 2,5-dichloro - 3,6 - bis(triphenylphosphoranylideneamino)-p-benzoquinone are rolled together on a two-roll mill at about 170° C. The resulting milled composition is molded into strips 5" in length, 0.5" in width and 0.045" in thickness and said strips are then subjected to an art recognized flame retardance test. The strips pass the test and are therefore designated as flame retardant.

Following the procedure of Example 17, the following examples were carried out utilizing various flame retardants of the instant invention and various thermoplastic resin polymers. The results of these examples are set forth in Table II, below. In each instance, the resultant composition passed the flame-retardance test and was designated as flame and fire retardant. In the table, PE =polyethylene, PAN=polyacrylonitrile, PP=polypropylene, PMMA=poly(methyl methacrylate), PMA=poly(methacrylic acid), PA=poly(acrylic acid), AN=acrylonitrile, ST=styrene and BD=butadiene.

TABLE II

| Ex. | Resin | Flame-Retardant Compound Produced In Example Number— | Percent |
|---|---|---|---|
| 18 | PMMA terpolymer | 1 | 15 |
| 19 | MMA/ST/AN 71/19/10 | 4 | 25 |
| 20 | PP | 2 | 25 |
| 21 | PE | 3 | 20 |
| 22 | PMMA | 2 | 15 |
| 23 | Mixture of BD/AN (10/75%) and AN/ST (25/90%).[1] | 1 | 25 |
| 24 | PA | 6 | 10 |
| 25 | PE | 10 | 20 |
| 26 | PMMA | 15 | 20 |
| 27 | AN/ST 90/10 | 7 | 25 |
| 28 | Same as 19 | 13 | 20 |
| 29 | PP | 11 | 25 |
| 30 | PMA | 5 | 10 |
| 31 | Same as 23 | 8 | 30 |
| 32 | PE | 9 | 20 |
| 33 | PMMA | 6 | 15 |
| 34 | PAN | 12 | 30 |
| 35 | PP | 14 | 25 |
| 36 | Same as 27 | 16 | 25 |

[1] U.S. Patent 2,349,202.

We claim:
1. A compound having the formula

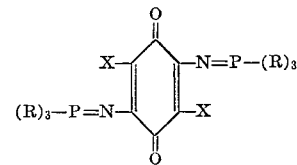

wherein X is selected from the group consisting of chlorine, bromine and iodine radicals and R is selected from the group consisting of phenyl, naphthyl, substituted phenyl and substituted naphthyl radicals, said substituents being selected from the group consisting of halogen, lower alkyl and lower alkoxy radicals.

2. A compound according to claim 1 wherein R is a phenyl radical.

3. A compound according to claim 1 wherein X is chlorine.

4. A compound according to claim 1 wherein R is a phenyl radical and X is chlorine.

5. A method for the production of a compound according to claim 1 which comprises reacting a dihalobenzoquinone having the formula

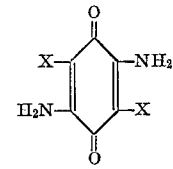

wherein X is as defined above, with a phosphinium halide having the formula $(R)_3PX_2'$ wherein R is defined as above and X' is a halogen radical, in the presence of a hydrogen halide acceptor and a solvent and at a molar ratio of phosphinium halide to dihalobenzoquinone of at least about 2:1, respectively.

6. A method according to claim 5 wherein R is a phenyl radical.

7. A method according to claim 5 wherein X is chlorine.

8. A method according to claim 5 wherein R is a phenyl radical and X is chlorine.

References Cited

UNITED STATES PATENTS 3,223,716  12/1965  Mosby et al. _____ 260—396

LORRAINE A. WEINBERGER, *Primary Examiner.*

L. A. THAXTON, *Assistant Examiner.*